United States Patent [19]
Silverman et al.

[11] Patent Number: 5,540,107
[45] Date of Patent: Jul. 30, 1996

[54] LIQUID FLOW METER

[75] Inventors: Ira Silverman, Newhall; Tulsidas R. Patel, West Hills, both of Calif.

[73] Assignee: Futureflo Systems, Inc., Newbury Park, Calif.

[21] Appl. No.: 279,833

[22] Filed: Jul. 25, 1994

Related U.S. Application Data

[63] Continuation of Ser. No. 764,429, Sep. 23, 1991, abandoned.

[51] Int. Cl.$^6$ .................................................. G01F 1/00
[52] U.S. Cl. .................................................. 73/861.78
[58] Field of Search ........................ 73/861.78, 861.79, 73/861.87, 861.86; 340/606, 607, 609, 610

[56] References Cited

U.S. PATENT DOCUMENTS

| | | | |
|---|---|---|---|
| 3,043,140 | 7/1962 | Waugh et al. | 73/861.35 |
| 3,343,721 | 9/1967 | Paley . | |
| 3,429,182 | 2/1969 | Wemyss | 73/229 |
| 3,670,924 | 6/1972 | Asper . | |
| 3,709,037 | 1/1973 | Abbotts . | |
| 3,733,898 | 5/1973 | Yamamoto et al. . | |
| 4,012,958 | 3/1977 | Taylor . | |
| 4,023,410 | 5/1977 | Althaus . | |
| 4,142,413 | 3/1979 | Bellinga . | |
| 4,199,982 | 4/1980 | Wemyss . | |
| 4,224,826 | 9/1980 | McLoughlin et al. . | |
| 4,253,314 | 3/1981 | Ikeda et al. . | |
| 4,253,341 | 3/1981 | Ikeda et al. | 73/861.77 |
| 4,265,127 | 5/1981 | Onada . | |
| 4,301,823 | 11/1981 | Meisenheimer, Jr. . | |
| 4,334,655 | 7/1982 | Sundstrome et al. . | |
| 4,337,655 | 6/1982 | Sundstrom et al. | 73/193 R |
| 4,404,860 | 9/1983 | Wood et al. | 73/861.78 |
| 4,489,616 | 12/1984 | Priddy . | |
| 4,512,201 | 4/1985 | Konrad et al. | 73/861.79 |
| 4,534,227 | 8/1985 | Petit | 73/861.87 |
| 4,656,873 | 4/1987 | Stewart . | |
| 4,666,061 | 5/1987 | Pluess . | |
| 4,833,925 | 5/1989 | Bullock et al. | 73/861.79 |
| 4,936,508 | 6/1990 | Ingalz | 340/610 |
| 5,014,552 | 5/1991 | Kamiunten et al. . | |
| 5,099,699 | 3/1992 | Kobold | 73/861.87 |

FOREIGN PATENT DOCUMENTS

| | | | |
|---|---|---|---|
| 0147004 | of 1984 | European Pat. Off. . | |
| 147001A1 | 7/1985 | European Pat. Off. | G01F 1/115 |
| 555536 | of 1974 | Switzerland . | |

*Primary Examiner*—Richard Chilcot
*Assistant Examiner*—Ronald Biegel
*Attorney, Agent, or Firm*—Poms, Smith, Lande & Rose

[57] ABSTRACT

An improved liquid flow meter for measuring moderate to low liquid flow rates with improved accuracy and minimal back pressure. The flow meter has a housing with two halves, a cover and a body, that fit together around a impeller so that liquid may flow and turn the impeller. Impeller performance is improved by use of a tapered inlet nozzle that increases liquid velocity while minimizing back pressure. Liquid is introduced tangent to the impeller by the tapered inlet nozzle to enhance initial impeller turning. The impeller registers the liquid flow by turning. The turning of the impeller is sensed electronically. Plenums are used for inlet and outlet flow to create regions of relatively consistent pressure regardless of duct location and orientation. The impeller fins are almost as wide as the impeller chamber to prevent liquid flow around the impeller. A magnet is encapsulated within the impeller that gives rise to a detectable electromagnetic flux when the impeller turns. A wire coil is used to detect the changing magnetic flux generated by the turning magnet. The wire coil uses an iron core to enhance flux detection. A pre-programmed microprocessor detects the coil's response and calculates pertinent information such as cumulative liquid flow. The microprocessor also keep track of the time since last reset. Flow meter status and warnings are transmitted to the user via indicators.

16 Claims, 4 Drawing Sheets

LIQUID FLOW METER

This application is a continuation of prior U.S. application Ser. No. 07/764,429, filed Sep. 23, 1991 abandoned.

BACKGROUND OF THE INVENTION

1. Field of the Invention

This invention relates to flow meters and more particularly to flow meters able to measure low flow rates while maintaining high accuracy and line pressure, enabling them to be used in household and other small demand environments.

2. General Background

Many applications exist for replaceable filter cartridges made of various materials that are used in filtration systems to filter water to remove impurities before the water is used. Examples are: point-of-use drinking water equipment, ice machines, and food and beverage vending equipment. Typically, these filter cartridges have a rated life by their manufacturers in terms of a specific volume, i.e. five hundred or one thousand gallons. Naturally, when the manufacturer's rated life has been reached, it is necessary to replace the filter cartridge to maintain water quality. Failure to do so may result in deterioration of water quality and filter cartridge clogging.

Timely maintenance of filter cartridges is especially important in drinking water equipment when health claims are being made. Manufacturers of filter cartridges have recently begun to recommend that filter cartridge replacements be made on a time basis as well as a volume basis, i.e. every six months or once a year, because bacteria tend to grow within the filter cartridges. The growth of bacteria within filter cartridges is related more to the time that the filter cartridge has been used than to the volume of water that has been filtered.

Due to the importance of proper filter maintenance to ensure water quality and a lack of commonly available meters, regulatory agencies which certify water filtration systems require that filter equipment without meters list their useful life at only one-half the actual filtration capacity. Similarly, regulatory agencies require plumbing elements, including flow meters and filter systems, to withstand extreme conditions to avoid catastrophic failure.

While the need exists for a flow meter/monitor to fulfill several needs (namely: track both liquid volume and time of use, as well as to signal the equipment user when end of life is approaching and when end of life has been reached to maintain manufacturers recommended service requirements), market pressures on pricing for such a meter are very sensitive. Such a meter need to be inexpensive, durable, and accurate in order to enjoy a position in the marketplace. Producing accurate flow meters for moderate to low flow rates, at reasonable cost, that exert little back pressure, while meeting regulatory standards, has not been easily or inexpensively accomplished in the past.

Liquid flow meters can also be used in farming, pharmaceutical and chemical processing, the production of soft drinks and other beverages, food processing, other industries, and almost anywhere the flow of liquid needs to be measured.

Common water systems deliver water at a pressure of approximately 60 pounds per square inch. Most filtration systems have a high pressure drop across them, which may decrease the water flow to the consumer. Any flow meter used in such a system must not inhibit the flow of water and must minimize any pressure drop across it. Factors in a flow meter that affect the flow rate and pressure drop across it include: the impeller chamber size, the impeller wheel size, the nozzle inlet and/or outlet size, the presence or absence of plenums, and the sizing and tapering of ducts, nozzles, and/or attachments.

Description of the Related Art

Liquid flow meters have been in use for many years. Recently such meters have achieved smaller dimensions and use electronic components to sense impeller movements.

Typically, flow meters able to measure liquid flow rates with precision are expensive and are not used for household and domestic purposes. Those flow meters that are feasible for household and domestic purposes are typically inaccurate or subject the water line to a significant pressure drop across the flow meter, thereby reducing the flow of water through the filtration system.

An Information Disclosure Statement has been filed addressing the related art and is incorporated herein by reference.

SUMMARY OF THE INVENTION

A flow meter for more precise measurement of the flow of water and/or other liquids, especially at moderate to low flow rates, creates minimal back pressure and enhances delivery of liquids so measured.

Water flowing through the flow meter turns an impeller inside the flow meter. The impeller is magnetically coupled to a sensing device that records the activity of the impeller. The flow of water within the flow meter is controlled by a series of chambers that increase impeller response to low flow rates while minimizing back pressure upon the liquid flow at all flow rates.

Two plenums, or special chambers, of relatively large volume provide the flow meter with regions of uniform liquid pressure. These plenums allow an inlet duct (connected to one plenum) and an outlet duct (connected to the other plenum) to be connected to the flow meter in any orientation.

A tapered nozzle serves as an inlet to the impeller chamber. The tapered nozzle increases the speed of liquid flowing through it. The liquid flowing through this nozzle pushes on the impeller so that it turns. To enhance impeller motion, the liquid is directed by the nozzle tangent to the impeller, and the liquid is forced to turn the impeller almost completely around before leaving the impeller chamber.

Indicators are used that inform the consumer of proper flow meter functioning and the approach and arrival of the end of useful life for filter cartridges or filter systems in-line with the flow meter. These indicators are coupled to the sensing device,-and are controlled by the flow of liquid through the flow meter. The indicators, and the useful life capacity and time setting of the flow meter may be selectably configured to customize the flow meter to the application at hand via electronic controls.

Certain other enhancements are used to increase impeller performance and to minimize pressure applied by the flow meter to the liquid. These enhancements are elaborated upon below.

OBJECTS OF THE INVENTION

It is an object of this invention to provide an inexpensive and reliable flow meter that can register low flow rates with improved accuracy.

It is another object of this invention to provide a flow meter that has a balanced impeller that is easy to start turning.

It is another object of this invention to provide a flow meter that minimizes back pressure upon the incoming liquid so that more pressure is transmitted past the flow meter.

It is yet another object of this invention to provide an easily manufactured flow meter that can be used in the home or in industry.

It is another object of this invention to provide users of the flow meter means by which the proper functioning of the flow meter can be verified.

It is another object of this invention to provide users of the flow meter means by which a consumable item in-line with the flow meter, such as a filter cartridge, can be monitored and have its end of life anticipated.

These and other objects and advantages will be apparent from a review of the following specification and the accompanying drawings.

DESCRIPTION OF THE PREFERRED EMBODIMENTS

Figure 1:
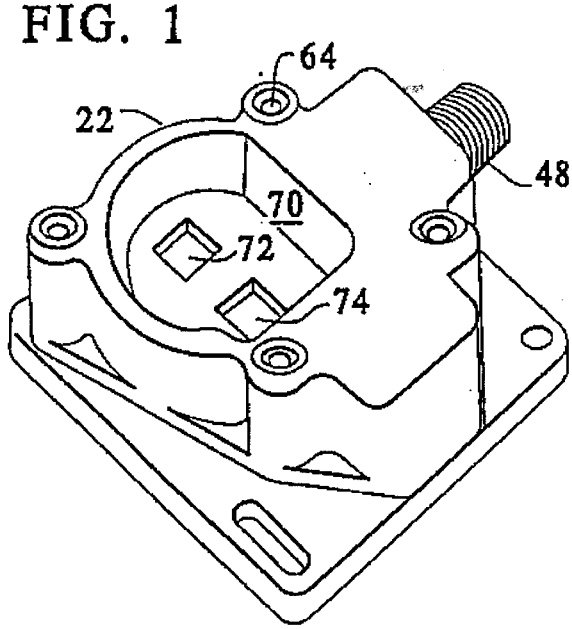
FIG. 1 shows a perspective view of the body of the improved liquid flow filter as viewed from the exterior.
Figure 2:
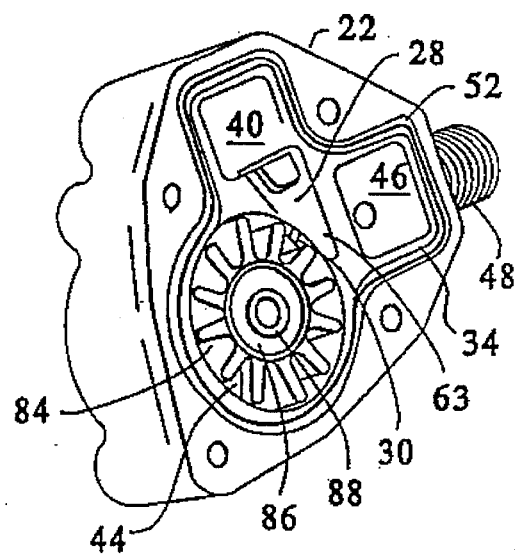
FIG. 2 shows a perspective view of the interior portion of the body of the liquid flow meter, with the impeller sitting in the impeller chamber portion of the body.
Figure 3:
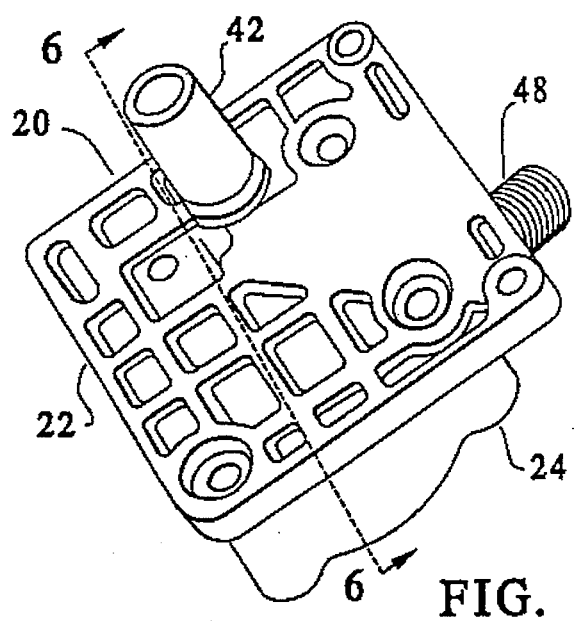
FIG. 3 shows a perspective view of the improved liquid flow meter, especially the cover, as viewed from the exterior.
Figure 4:
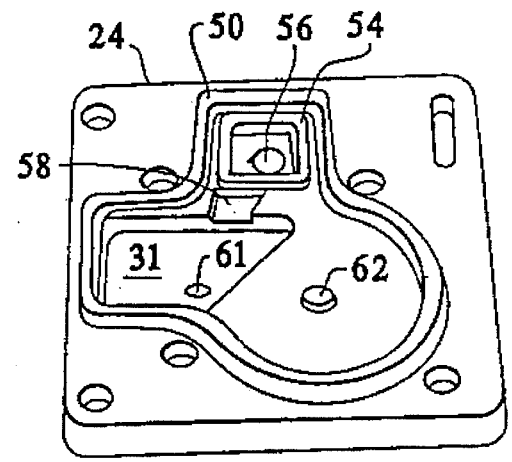
FIG. 4 shows a perspective view of the interior portion of the cover of the liquid flow meter.
Figure 5:
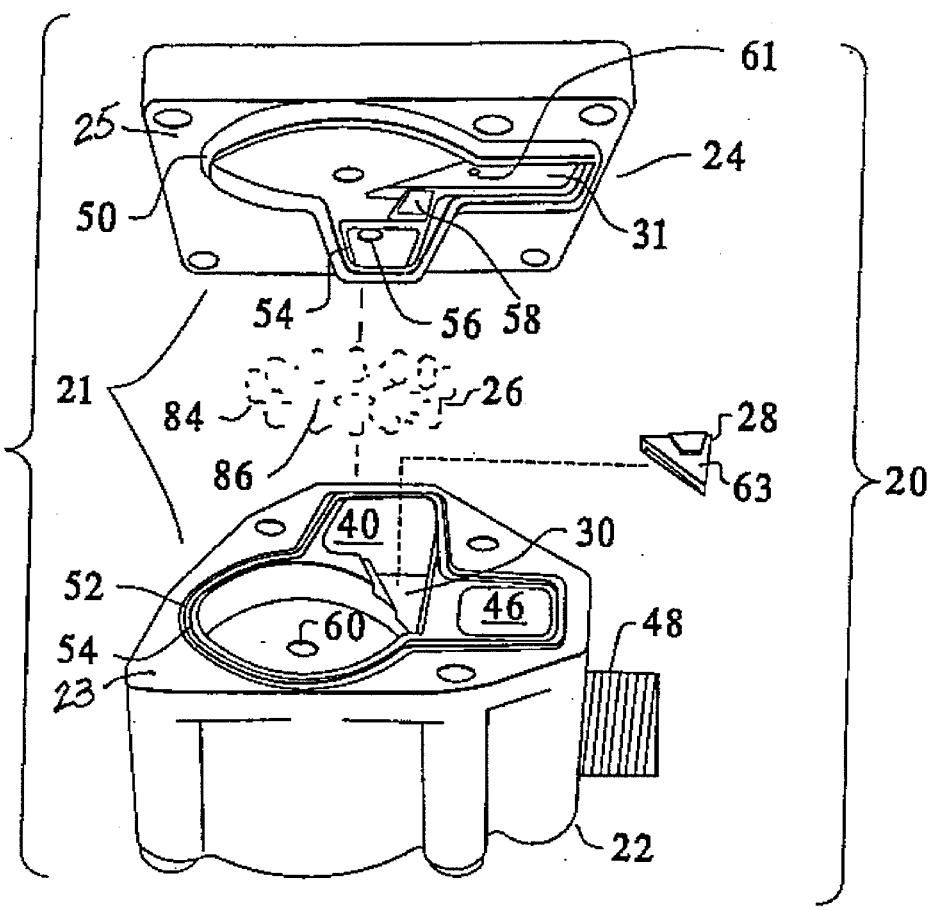
FIG. 5 shows a perspective view of the body and cover portions of the flow meter, with the impeller shown in phantom and the flow partition moved to the side.

Referring generally to the FIGS. 1–5, especially FIG. 5, a liquid flow meter 20 of polypropylene or other inert material has a housing composed of two halves, a body half 22, and a cover half 24. Between the body 22, and cover 24 of the housing 21, a number of chambers and passages are defined. The several chambers communicate with one another by means of the passages. The construction of these chambers and passages combine to minimize the lowest flow that can be accurately measured while simultaneously maximizing the further transmission of pressure through and past the flow meter 20. Further, the construction of the chambers and passages allows the inlet and outlet to the flow meter 20 to be oriented in any manner.

The flow meter 20 of the present invention is preferably of small dimensions, approximately two inches by two inches by one and one-half inches. The small dimensions of the flow meter 20 allow it to be used in many convenient locations where liquid flow is to be measured.

A brief overview of the different components of preferred flow meter is set forth immediately below. The body half 22 and the cover half 24 each has an inside face 23 and 25, respectively, which face toward each other. The characteristics and elements of each particular component is then set forth in detail.

An inlet duct 42 allows the flow of liquid to initially enter the flow meter 20. An inlet plenum or chamber 40 in the body 24 is in communication with the inlet duct 42 of the cover 24. The inlet plenum 40 is connected to a tapered inlet nozzle 30 which is covered by a removable flow partition 28. The tapered inlet nozzle 30 leads into the impeller chamber 44 in which an impeller 26 rests or turns according to the flow of liquid. An exit chamber 32 formed by an exit depression 31 in the cover 24 leads from the impeller chamber 44 to the outlet plenum or chamber 46. The outlet plenum 46 leads to an outlet duct 48.

Inlet 42 and outlet 48 ducts may be constructed with pipe threads, as a compression joint, as a straight tube, or any other suitable connection as required by the application implementing the flow meter 20 of the current invention.

The two plenums 40, 46 and the impeller chamber 44 in the body 22 are surrounded on their perimeter by a gasket holder 52. A gasket 34, or O-ring, is seated within the gasket holder 52. A gasket ridge 50 is part of the cover 24 and fits within the gasket holder 52 to provide the flow meter 20 with a seal when the body 22 and cover 24 are joined. A plenum ridge 54, also part of the cover 24, fits within the inlet plenum 40 and surrounds the inlet 56 of the inlet duct 42. Plenum ridge 54 also helps to provide a seal for the inlet plenum 40. A flow partition depression 58 is adjacent-to the plenum ridge 54. A portion of the flow partition 28 fits within the depression 58 so that flow partition 28 may be secured within the flow meter 20.

The gasket ridge 50 also provides structural integrity for the cover 24 so that it can withstand the high pressures (on the order of five hundred pounds per square inch) exerted upon the flow meter during regulatory testing. While the cover 24 covers areas that experience hydraulic pressure (the two plenums 40, 46 and the impeller chamber 44), the cover does not need additional thickness in order to withstand test pressures. Instead, the gasket ridge 50 allows the cover to undergo such test pressures without failing by providing the cover 24 with structural support and increased stiffness.

In the body 22, threaded holes 64 are present for stainless steel screws to attach the cover 24 to the body 22. However, other known means of attachment may be used to attach and seal the cover 22 to the body 24.

On the reverse side of the flow meter body 22 is a depression 70 (having sub-depressions 72, 74) in which fits the impeller sensor 36 with its magnetic induction coil 80 and flux concentrator 82. The sub-depressions 72, 74 position the impeller sensor 36 within the depression 70 so that a close and uniform relationship may be maintained between the impeller sensor and the impeller.

External to the flow meter 20 is an impeller sensor 36. The impeller sensor is placed in close proximity to the impeller 26 while remaining outside the flow meter. Logic circuitry, such as a pre-programmed microprocessor, is connected to the impeller sensor. When the impeller sensor detects the impeller turning, signals are generated which are recorded by the pre-programmed microprocessor. Connected to the logic circuitry are indicators that display the current flow meter 20 status, or other relevant information to the user.

The inlet duct 42 provides means by which the flow meter 20 is connected to an incoming liquid line. Preferably, the flow meter 20 is attached to a stable surface or other structure with liquid flow lines (not shown) securely attached to the inlet 42 and outlet 48 ducts. The inlet duct 42 also provides means by which liquid is introduced into the flow meter 20.

The inlet duct directs the flow of liquid into the inlet plenum 40. The inlet plenum 40 encompasses a volume significantly larger than the inlet duct 42 and maintains a constant liquid pressure within its interior without creating excessive back pressure. The inlet plenum 40 allows the inlet duct 42 to be placed in any plane or orientation with respect to the flow meter 20 without changing the performance of the flow meter 20. The placing of the inlet duct 42 with respect to the inlet plenum does not affect performance of the flow meter 20 either by increasing the pressure drop or decreasing the accuracy of the flow meter 20. The inlet plenum 40 also provides a way of mediating the flow of liquid between the inlet duct 42 and the tapered inlet nozzle 30 with the subsequent impeller chamber 44. The inlet plenum 40 helps to balance the forces on the impeller 26 by preparing the liquid for travel through the tapered inlet nozzle 30. With the inlet plenum 40 creating a space of equal pressure, liquid travel through the tapered inlet nozzle 30 is generally uniform. Uniform liquid flow through the tapered inlet nozzle 30 causes the liquid to exert a generally consistent force on the impeller 26. This helps to prevent the impeller 26 from locking up through contact with the impeller housing surface of the impeller chamber 44.

The tapered inlet nozzle 30 tapers toward the impeller chamber 44 and is covered by the flow partition 28 The tapering of the inlet nozzle 30 provides for relatively high liquid velocity through the inlet nozzle 30, even though the pressure of the liquid is low. The tapered inlet nozzle 30 also minimizes the pressure drop across the flow meter 20 by exerting minimal back pressure while providing the high liquid velocity. The tapered inlet nozzle 30 directs liquid flowing through it tangent to the fins 84 of the impeller 26, allowing the flow of liquid through the tapered inlet nozzle 30 to impact or flow directly against the fins 84 of the impeller 26. This tangent relationship between the liquid flow and the impeller fins 84 helps to prevent liquid from flowing around the impeller fins 84 and increases the probability that for low flow rates, the impeller 26 will begin to turn. The tangent relationship also uses more of the liquid flow to turn the impeller 26 so that more of the liquid flow is registered by the flow meter 20.

The number of fins 84 present on the impeller 26 are optimized so that the least liquid bypasses the fins 84 while minimizing back pressure created by the fins 84. The impeller 26 consistently begins turning (and therefore, registering liquid flow) below one-eight of a gallon per minute, and has started to turn at flow rates as low as one-twentieth of a gallon per minute depending upon flow meter 20 orientation with respect to gravity.

The impeller 26 is the only moving part in the flow meter 20. The impeller 26 has radial fins 84 emanating from a central hub 86. The flow meter 20 is capable of measuring within two percent error flow rates of one quarter to two gallons per minute. For a flow rate of one gallon per minute, only six pounds per square inch of line pressure are lost through the flow meter 20.

Figure 7:
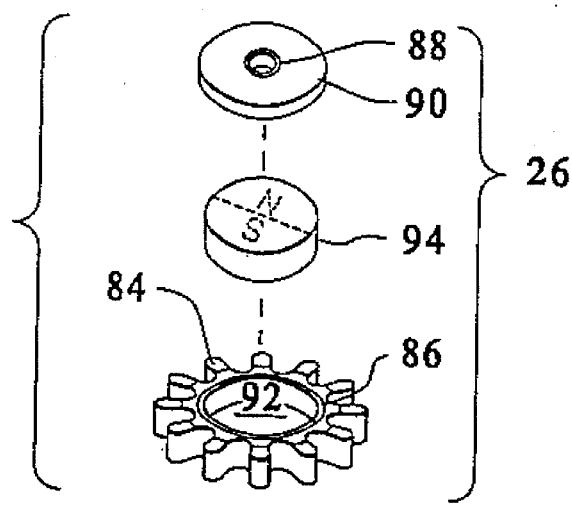
FIG. 7 shows a perspective view of the impeller of the flow meter.

Referring to FIG. 7, a removable cover 90 is present on one side of the impeller hub 86 that covers an impeller compartment 92. Within the impeller compartment 92 is securely attached a magnetic element 94 that creates the magnetic flux sensed by the impeller sensor 36. The magnetic element has at least two poles (north and south) exposed on its face so that a point near the perimeter of the magnet experiences a changing magnetic flux when the magnet rotates. While it is preferable to have the impeller 26 as a whole magnetic, current regulatory constraints on materials require that a magnet 94 be securely sealed within the impeller 26. The magnet 94 is sealed within the impeller compartment 92 by the impeller cover 90 using ultrasonic welding or other known means.

The magnetic element 94 present within the hub compartent 92 of the impeller 26 is securely attached within the hub compartment 92. The magnetic element 94 provides a central, evenly distributed weight so that the impeller 26 is balanced. The magnetic element 94 is symmetric and its central location provides a low moment of inertia, leading to better performance by the impeller 26 and flow meter 20 as a whole. The magnetic element 94 allows the flow meter 20 to enjoy linear and reliable performance within reasonable flow rate tolerances. The magnetic element 94 introduces little noise into the system when the changing magnetic flux is sensed by the impeller sensor 36. The magnetic element 94 provides for high magnetic flux changes so that the rotation of the impeller 26 is more easily sensed by the impeller sensor 36.

The impeller fins 84 are wider than the impeller hub 86 and are approximately the same, but slightly less than, the width of the impeller chamber 44. This impeller fin 84 design reduces flutter (wobble or rattling) by the impeller 26 within the impeller chamber 44 and provides for a balanced impeller 26 and impeller operation.

When at rest within the impeller chamber 44, the impeller 26 rests upon its fins 84 and not upon its hub 86. This provides the impeller 26 with greater mobility and easier initial turning when starting from rest. Preferably, the impeller 26 is neutrally buoyant and has as little inertia as possible so that less liquid force is needed to move and maintain spinning impeller 26.

As seen in FIG. 7, the impeller hub 86 has rings 88 around its center that correspond to and fit over the bosses 60, 62 present in the impeller chamber 44. The ring 88 on the far side of the impeller hub 86 in FIG. 7 is not shown.

Referring now to FIG. 5, the impeller chamber 44 is formed by the covered body 22 of the flow meter 20. The impeller chamber 44 is slightly wider than the impeller fins 84 so that there is a close, but not snug, fit between the impeller 26 and the impeller chamber 44. The impeller 26 turns freely within the impeller chamber 44. That is, the impeller 26 does not rotate on a shaft projecting into the impeller chamber 44. The impeller chamber 44 contains the bosses 60, 62 which are slightly off-center so that the impeller fins 84 do not touch or make contact near the inlet to the impeller chamber 44 when the impeller 26 is at rest. The rings 88 present on the impeller 26 encircle the bosses 60, 62 and restrain the impeller 26 from coming to rest and making contact with the inlet.

For low liquid velocities, the liquid momentum and the force of the liquid against the impeller fins 84 spins the impeller. For higher liquid velocities, a vortex is formed inside the impeller chamber 44 and the impeller 26 is spun by the vortex. Liquid exits the impeller chamber 44 only at the entrance to the exit chamber 32.

The flow of liquid from the impeller chamber 44 to the exit chamber 32 is through the perpendicular travel of the liquid with respect to the plane of the impeller chamber 44. The liquid travels in a circular manner within the impeller chamber 44 when injected therein through the tapered inlet nozzle 30. After coursing around the impeller chamber 44 and driving the impeller 26, the liquid again encounters the inlet to the impeller chamber 44. As the liquid cannot flow back out the inlet as more incoming liquid is already present there, the liquid that has coursed around the impeller chamber 44 is urged into the exit chamber 32 as a path presenting least resistance. While in an alternative embodiment, the exit chamber may be placed so that liquid exits at any point, the embodiment presented in the drawings maintains the flow of liquid against the impeller fins 84 of a longer period of time (according to the "right hand rule").

The exit chamber 32 is formed between the outlet depression 31 (formed in the flow meter cover 24) and the flow partition 28, body 22, and outlet plenum 46. The entrance 33 to the exit chamber 32 is in communication with the impeller chamber 44 when the cover 24 is fitted onto the base 22. Proximate to the flow partition 28 and tapered with respect to the opposite side of the impeller chamber 44, exit chamber 32 leads to the outlet plenum 46. The exit chamber 32 has a streamlined finger 61 that is in contact with and holds down the end top 63 of the flow partition 28. The diagonal portion of exit chamber 32 closest to the impeller chamber slightly overlaps the impeller chamber 44 to provide an exit path for fluid travelling through the impeller chamber 44. Once the fluid has travelled through the impeller chamber 44, so other exit means are present to the fluid, and the fluid is urged from the impeller chamber 44 by way of exit chamber 32.

Exit chamber 32 is positioned proximate and slightly upstream of the tapered inlet nozzle 30. As the fluid must flow downstream, in order to exit the impeller chamber 44, the fluid must travel almost the entirety of impeller chamber 44 before exiting through the exit chamber 32. During the course of travel, the fluid presses upon the impeller 26, causing it to turn and registering the flow of the fluid. As the fluid presses upon the impeller 26 for almost the entire circumference of the impeller chamber 44, the forces upon the impeller 26 are balanced and impeller 26 contact with the impeller chamber 44 is reduced. Error and noise introduced into the measurement of the fluid flow is likewise reduced as losses from impeller chamber 44 contact are reduced. The exit chamber 32 is of sufficient cross section to minimize back pressure upon the liquid.

The exit chamber 32 lead the flowing liquid to the outlet plenum 46. The outlet plenum 46, like the inlet plenum 40, provides constant liquid pressure so that the outlet duct 48 may be positioned in any orientation.

The liquid flow through the flow meter 20 is as follows. Liquid is forced by line pressure through the inlet duct 42. Upon entry to the inlet plenum 40, the inlet plenum 40 transfers the liquid into the tapered inlet nozzle 30. The liquid that travels through the tapered inlet nozzle 30 pushes or impels the impeller fins 84 to move the impeller 26 in a circular manner. The liquid then travels around the impeller chamber 44, pushing the impeller fins 84. Upon approaching the tapered inlet nozzle 30 at the end of its journey, the liquid travels into the exit chamber 32 and over the flow partition 28. The liquid exits the impeller chamber 44 through the exit chamber 32 as the liquid must keep flowing due to the pressure upon it and cannot flow back through the tapered inlet nozzle 30 due to the incoming flow. The liquid then flows from the exit chamber 32 into the outlet plenum 46, through the outlet duct 48, and out into the outgoing liquid line.

Figure 9:
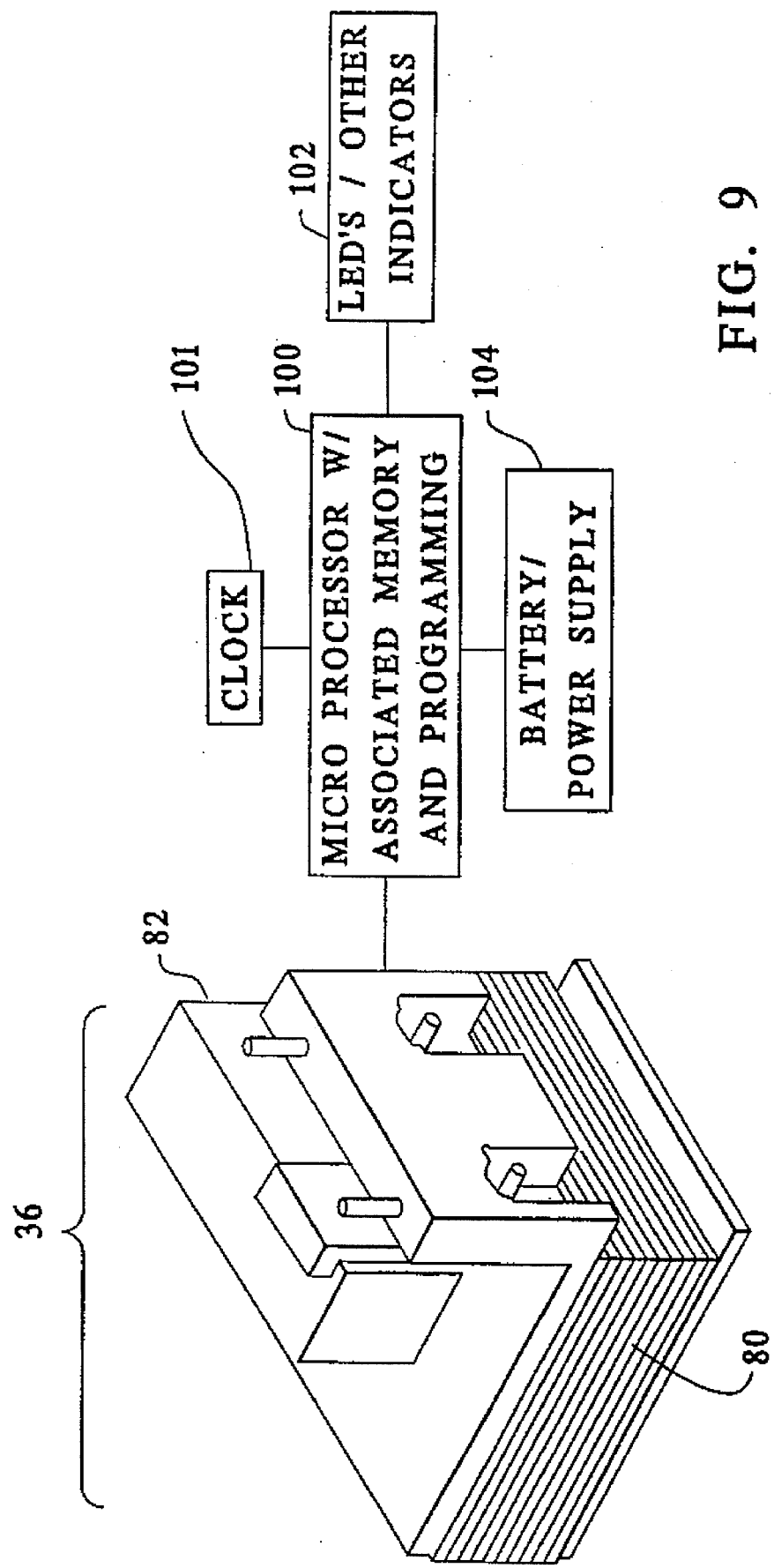
FIG. 9 shows a view of the electronic sensor or impeller sensor of the flow meter, including the schematic attachment of the impeller sensor to the other associated circuitry.

Referring to FIG. 9, the electronic portion of the flow meter 20 registers the rotating motion of the impeller 26 due to the changing magnetic flux locally present and generated by the rotating magnetic element 94 inside the impeller 26. A wire, or other conductor, induction coil 80 generates an electric current in response to the changing magnetic flux generated ing by the turning magnetic element 94. A flux concentrator 82 passes through the coil 80 center and enables the induction coil 80 to generate a higher current when the magnetic element 94 rotates. The flux concentrator 82 allows use of a smaller and lighter magnet 94, thereby lessening the inertia present in the impeller 26 and giving rise to better flow meter performance through a better performing impeller 26.

The magnetic element 94 presents both north and south poles to the impeller sensor 36 through each rotation, as each pole occupies a portion of the magnetic element 94. At least two pulses (depending upon the number of poles, possibly several, on the face of the magnet) are present for each turn of the impeller 26 giving rise to a more accurate detection of impeller 26 rotation.

The signal created by the impeller sensor 36 may be amplified and is transmitted to a pre-programmed microprocessor 100. The signals from the impeller sensor 36 are detected by the pre-programmed microprocessor 100 and enable the pre-programmed microprocessor to detect motion of impeller 26 and therefor, accompanying liquid flow. The pre-programmed microprocessor 100 is able to calculate from pre-programmed-constants the flow rate of the liquid. Depending on the size of the flow meter elements, approximately 3400 counts are measured for each gallon flowing through the flow meter 20 and the pre-programmed microprocessor 100 may be re-calibrated so that it can calculate different rates of flow.

Power is provided to the pre-programmed microprocessor 100 through batteries 104 and electric current constraints are present limiting the maximum measurable flow to approximately three gallons per minute. Such electric current constraints are lifted when the power required is supplied by another power source, such as an adapter or transformer that converts alternating current (AC) from a wall socket to direct current (DC) usable by the electronics portion of the flow meter 20. The use of an AC/DC adapter allows the pre-programmed microprocessor to operate at a higher frequency with possibly higher accuracy.

The pre-programmed microprocessor 100 also controls the modes of operation of the liquid flow meter 20. It also provides signals to the user upon registering certain accumulations of time or liquid flow via indicators 102. The pre-programmed microprocessor 100 may also be connected to a clock 101 to monitor the accumulated time since the last reset or filter change. All electronic components may be encased in plastic after assembly to protect them from the liquid or other environmental conditions.

User signals are provided by indicators 102 such as: LED's (light emitting diodes) buzzers, and/or an LCD screen connected to the pre-programmed microprocessor 100. Such indicators 102 may be kept with the unit, or at a distance for convenient inspection.

In the preferred embodiment, the indicators used are a green LED, a red LED, and a buzzer audible over the noise created by the flowing liquid. Five modes are present to indicate to the user the functioning status of the flow meter 20 and/or an attached filter system.

In the first mode, the flow meter 20 is standing-by to measure the flow of liquid, but there is no liquid flowing. This is stand-by mode. During stand-by mode, the flow meter 20 registers no liquid flow, but only accumulates time via the clock 101. During stand-by mode, neither LED nor the buzzer is activated.

In the second, third and fourth modes, liquid is flowing through the flow meter 20 as it indicates either its current status or that of an attached filter system.

The second mode is the normal flow mode. Normal flow mode occurs when liquid flows through the flow meter 20, and no conditions are present that require further indication. During normal flow mode, the green LED flashes once per second.

The third mode is the warning mode. Normal delivery times to replacement filter elements are typically on the order of two weeks, but may be more or less according to various circumstances such as vendor proximity and means of delivery. When the flow meter 20 senses that the filter system is within two weeks of the end of its useful life, or when the flow meter senses that the filter system is within a certain terminal period in the useful life of the filter system (i.e. the last fifty gallons), the warning mode is manifested by the indicators 102. During the warning mode, the green LED flashes once per second, the red LED flashes once every two seconds, and the buzzer sounds once every three seconds. The warning mode is indicated while the liquid is flowing through the flow meter 20.

The fourth mode is the end of life mode. Upon sensing the end of the filter system's useful life, either by time used or volume filtered, the pre-programmed microprocessor 100 ceases to flash the green LED while the liquid is flowing. During liquid flow, the end-of-life mode is indicated by flashing the red LED once per second and sounds the buzzer once per second.

In the fifth mode the buzzer sounds once every one-half minute to indicate the presence of low batteries. This is the low battery mode.

While the user of the flow meter 20 may choose to ignore the indications made by the indicators 102, the indicators allow the user to anticipate the end of the filter system's useful life. Normal functioning is also indicated, assuring the user that all is well. Further modifications can be made of this indicating system to suit the needs of the particular user.

The housing and related structures of the flow meter 20 are constructed of polypropylene, more particularly COMALLOY, AQUALLOY 135 polypropylene. The minimum pressure drop of approximately six pounds per square inch across the flow meter 20 is achieved at approximately one gallow per minute, which means that filter performance will not be inhibited when the flow meter 20 is used on low pressure systems. Flow rates as low as one-eight of a gallon are detectable, but the linear region for the flow meter 20 lies approximately between one-quarter to two gallons per minute. The plenums 40, 46, ducts 42, 48 and linear response of the flow meter 20 at low flow rates help provide 10 w static pressure drops across the flow meter 20.

Figure 8:
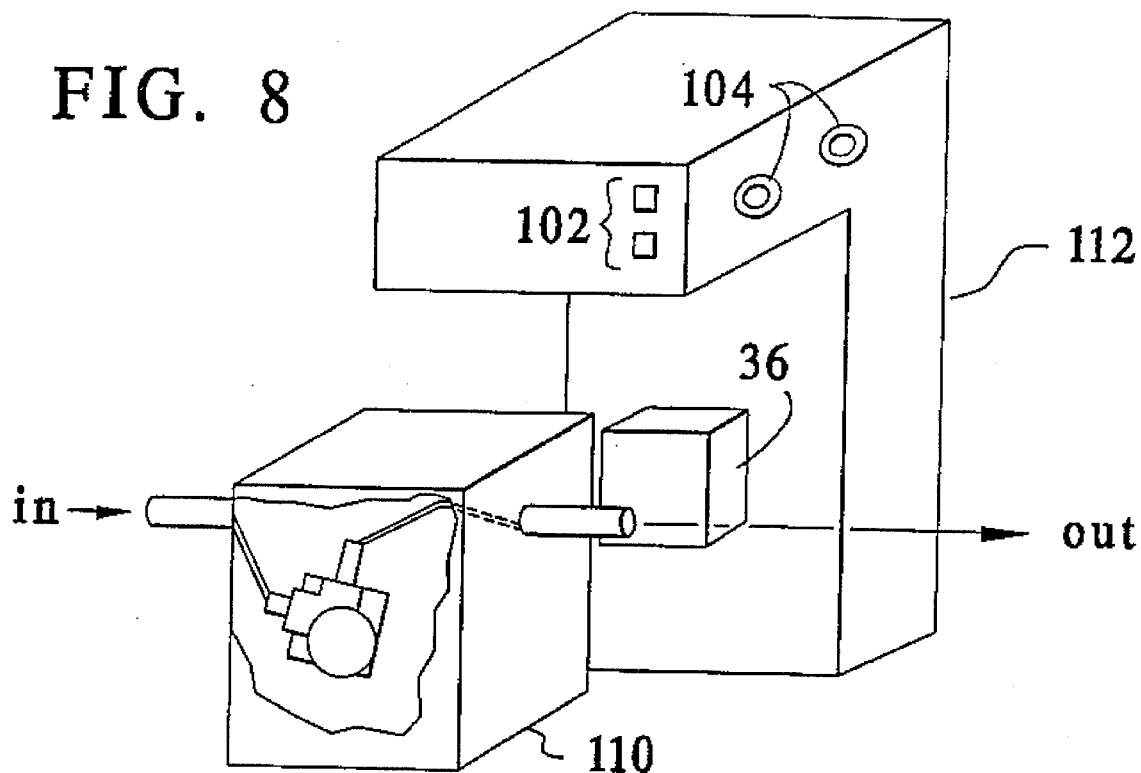
FIG. 8 shows the flow meter in a modular package.
Figure 6:
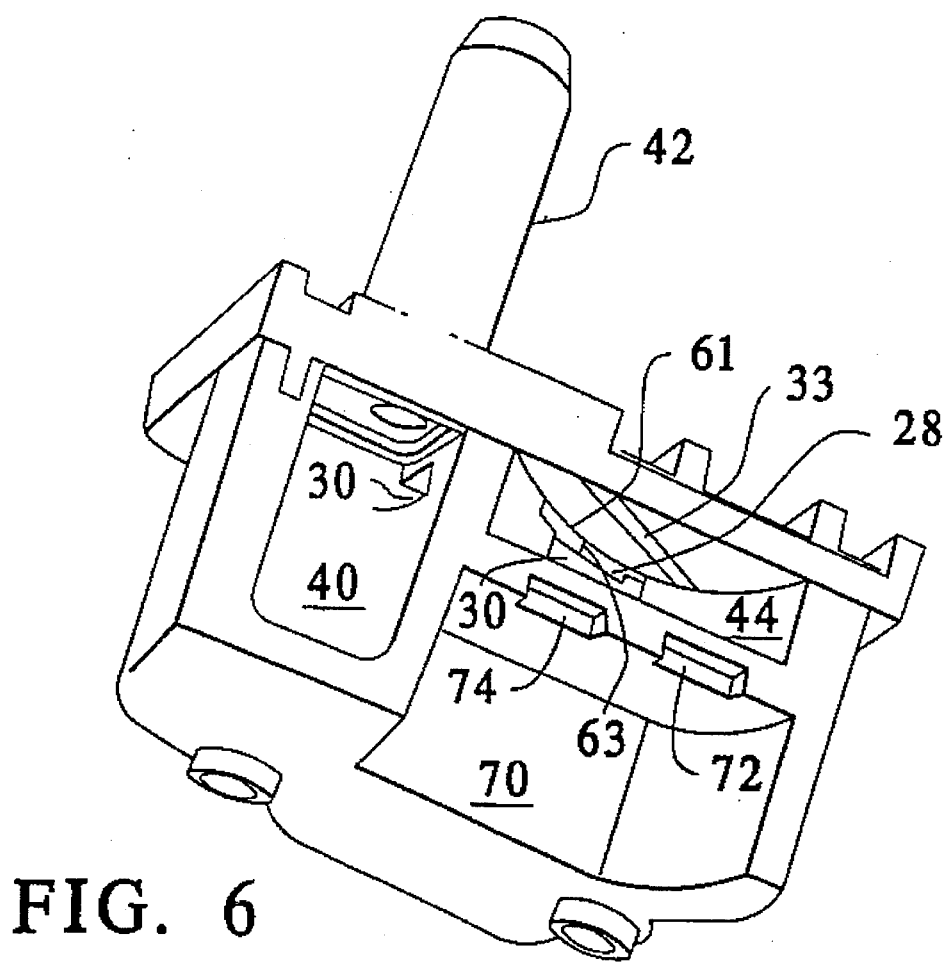
FIG. 6 shows a perspective, cross section of the flow meter taken generally along line 6—6 of FIG. 3.

Referring to FIG. 8, a modular packaging design is set forth. Two portions are present in the modular packaging design: a flow meter portion 110 and an electronics portion 112. The flow meter portion 110 has the flow meter 20 as set forth above in a modular package. The depression 70 of the impeller sensor 36 is in back of the flow meter portion 110. The electronics portion 112 contains the pre-programmed microprocessor 100 and related circuitry, including the LED's/indicators 102 and the batteries/power supply 104. The LED's/indicators 102 may be placed on the opposite side of the electronics portion or at a distance from the unit as a whole. The impeller sensor 36 is also housed within the electronics portion 112, and protrudes from the electronics portion 112 so that it may fit within the depression 70 in back of the flow meter portion 110.

While the modular package may place the impeller sensor 36 a greater distance from the impeller 26, the response of the impeller sensor due to the flux concentrator 82 is sufficient to maintain accurate impeller sensing and flow measurement.

While the present invention has been described with regards to particular embodiments, it is recognized that additional variations of the present invention may be devised without departing from the inventive concept. It is contemplated that the present invention of the flow meter set forth above may be advantageously used in place of many currently available flow meters. Although the use of the flow meter in conjunction with water filtration has been set forth, no limitations are seen that prevent the flow meter from being used to measure the flow of any liquid so long as the flow meter is inert with respect to the liquid.

What is claimed is:

1. A fluid flow meter comprising:
   a. a main housing;
   b. a cylindrical impeller chamber comprising a pair of planar walls and a cylindrical wall between the planar walls;
   c. an impeller received within the impeller chamber, the impeller comprising a central hub and multiple vanes extending outward from the central hub, the impeller having an axis of rotation, the outside diameter of the impeller being slightly less than the diameter of the cylindrical wall, the impeller having an axis of rotation and turning freely about the axis of rotation;
   d. a magnet mounted in and rotating with the impeller;
   e. an inlet chamber in the main housing adjacent the impeller chamber, and an inlet extending from outside the main housing into the inlet chamber through which fluid flows from outside the main housing into the inlet chamber;
   f. a nozzle extending from the inlet chamber into the impeller chamber at an angle to the axis of rotation of the impeller, the nozzle increasing the velocity of the fluid flow from the inlet chamber into the impeller chamber, the fluid flow causing the impeller to rotate in a predetermined direction about its axis of rotation;
   g. an outlet chamber in the main housing, an exit in one of the planar walls of the impeller housing communicating with the outlet chamber, the exit chamber being located adjacent the nozzle around the impeller chamber in the direction of rotation of the impeller so that the fluid directed by the nozzle between the vanes travels most of the distance around the impeller chamber from the nozzle to the exit chamber; and
   h. a magnetic sensor mounted in the housing for counting rotations of the magnet in the impeller.

2. The fluid flow meter of claim 1 wherein the exit chamber is at least 270 degrees around the chamber from the nozzle.

3. The fluid flow meter of claim 1 wherein the central hub is recessed from the vanes so that the vanes project closer to the planar walls of the impeller chamber than the central hub projects.

4. The fluid flow meter of claim 3 further comprising a boss on one of the planar walls and a ring on the side of the central hub facing the boss.

5. The fluid flow meter of claim 3 further comprising:

a pair of bosses, one on each planar wall of the impeller chamber, a pair of rings, one on each side of the central hub, one boss contacting one ring when fluid is not flowing through the impeller chamber;

the bosses having a central axis and the impeller chamber having a central axis that does not correspond with the central axis of the bosses.

6. The fluid flow meter of claim 5 wherein the central axis of the bosses is farther from the nozzle than the central axis of the impeller chamber.

7. The fluid flow meter of claim 5 wherein the planar walls are parallel to each other.

8. The fluid flow meter of claim 1 wherein the exit chamber has an effective cross section no less than the cross section of the nozzle.

9. The fluid flow meter of claim 1 wherein the nozzle comprises a single tapered nozzle as the only passage from the inlet chamber into the impeller chamber.

10. The fluid flow meter of claim 1 wherein the vanes extend close enough to the planar walls and to the cylindrical wall to retain fluid between adjacent vanes.

11. The fluid flow meter of claim 1 wherein the proximity of the vanes to the planar wall and to the cylindrical wall prevents fluid from passing from the region between adjacent vanes at the nozzle from passing into the exit chamber until that region rotates away from the nozzle.

12. A fluid flow meter comprising:

a. a main housing comprising a body half and a cover half, each half having an inside face, the body half and the cover half being attached together with their inside faces facing each other;

b. a cylindrical impeller chamber comprising a generally cylindrical depression in the inside face of the body half having a top toward the inside face and a bottom, a planar wall at the bottom of the depression;

c. an inlet plenum comprising a cavity extending into the inside face of the body half adjacent the impeller chamber, and an inlet extending outside the main housing into the inlet plenum through which fluid flows from outside the main housing into the inlet plenum;

d. an outlet plenum comprising a cavity extending into the inside face of the body half adjacent the impeller chamber;

e. a seal in the inside face of the body half and in the inside face of the cover half surrounding the impeller chamber and the inlet and outlet plenums when the body half and the cover half are together;

f. an impeller received within the impeller chamber, the impeller comprising a central hub and multiple vanes extending outward from the central hub, the impeller having an axis of rotation;

g. a nozzle comprising a nozzle cavity extending from the inlet plenum into the impeller chamber;

h. an exit chamber comprising an outlet plenum depression in the inside face of the cover half intersecting the outlet plenum cavity in the body half, a portion of the outlet plenum depression extending over the impeller chamber, fluid flowing from the impeller chamber into the outlet plenum depression; and i. a sensor mounted in one of the body halves for counting rotations of the magnet in the impeller.

13. The fluid flow meter of claim 12 further comprising a flow partition attached to the body half extending over the nozzle cavity.

14. The fluid flow meter of claim 13 wherein a portion of the cover half contacts the flow partition for securing the flow partition to the body half.

15. The fluid flow meter of claim 12 wherein the impeller rotates about its axis of rotation in a direction of rotation, the outlet plenum depression being located at least 270° around the impeller chamber from the nozzle cavity in the direction of rotation of the impeller.

16. The fluid flow meter of claim 15 further comprising:

a pair of bosses, one on the planar wall at the bottom of the cylindrical depression and the other on the inside face of the cover body, a pair of rings, one on each side of the central hub, one boss contacting one ring when fluid is not flowing through the impeller chamber.

* * * * *